US011828982B2

(12) United States Patent
Kang et al.

(10) Patent No.: US 11,828,982 B2
(45) Date of Patent: Nov. 28, 2023

(54) OPTICAL ARRAY WAVEGUIDE GRATING-TYPE MULTIPLEXER AND DEMULTIPLEXER AND CAMERA MODULE COMPRISING THE SAME

(71) Applicant: LG INNOTEK CO., LTD., Seoul (KR)

(72) Inventors: Lee Im Kang, Seoul (KR); Chang Hyuck Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 111 days.

(21) Appl. No.: 17/189,345

(22) Filed: Mar. 2, 2021

(65) Prior Publication Data

US 2021/0181413 A1 Jun. 17, 2021

Related U.S. Application Data

(63) Continuation of application No. 15/578,966, filed as application No. PCT/KR2016/005860 on Jun. 2, 2016, now Pat. No. 10,962,712.

(30) Foreign Application Priority Data

Jun. 3, 2015 (KR) .................. 10-2015-0078624
Jun. 18, 2015 (KR) .................. 10-2015-0086339

(51) Int. Cl.
*G02B 6/12* (2006.01)
*G01J 3/02* (2006.01)
(Continued)

(52) U.S. Cl.
CPC .......... *G02B 6/12011* (2013.01); *G01J 3/021* (2013.01); *G01J 3/0205* (2013.01);
(Continued)

(58) Field of Classification Search
CPC ........ G01J 3/0237; G01J 3/0205; G01J 3/021; G01J 3/0256; G01J 3/1895; G01J 3/2823;
(Continued)

(56) References Cited

U.S. PATENT DOCUMENTS 6,829,073 B1 12/2004 Krol et al.
6,920,264 B2 7/2005 Tabuchi
(Continued)

FOREIGN PATENT DOCUMENTS

EP 2 506 048 A1 10/2012
KR 10-2002-0092209 A 12/2002
(Continued)

*Primary Examiner* — Violeta A Prieto
(74) *Attorney, Agent, or Firm* — Birch, Stewart, Kolasch & Birch, LLP

(57) ABSTRACT

An optical array waveguide grating-type multiplexer and demultiplexer according to an embodiment of the present invention comprise: a first substrate, a plurality of first waveguides disposed on the first substrate to be superposed in the vertical direction, which is the thickness direction of the first substrate; a 1-1st cladding layer disposed between the first substrate and a 1-1st waveguide, which is nearest to the first substrate among the plurality of first waveguides; a 1-2nd cladding layer disposed between the plurality of first waveguides; and a 1-3rd cladding layer disposed on a 1-2nd waveguide, which is furthest from the first substrate among the plurality of first waveguides.

12 Claims, 10 Drawing Sheets

(51) Int. Cl.
 *G01J 3/18* (2006.01)
 *G01J 3/28* (2006.01)
 *G02B 6/293* (2006.01)

(52) U.S. Cl.
 CPC .......... *G01J 3/0256* (2013.01); *G01J 3/1895* (2013.01); *G01J 3/2823* (2013.01); *G02B 6/12002* (2013.01); *G02B 6/2938* (2013.01); G01J 3/0237 (2013.01); G02B 2006/12164 (2013.01)

(58) Field of Classification Search
 CPC ............... G01J 3/0208; G01J 3/0272; G02B 2006/12164; G02B 6/12002; G02B 6/12011; G02B 6/12014; G02B 6/2938
 See application file for complete search history.

(56) References Cited

U.S. PATENT DOCUMENTS

| | | | |
|---|---|---|---|
| 6,952,504 | B2 | 10/2005 | Bi et al. |
| 7,756,376 | B2 | 7/2010 | Tsuda |
| 8,673,407 | B2 | 3/2014 | Bi et al. |
| 10,962,712 | B2 * | 3/2021 | Kang ................. G02B 6/12011 |
| 2002/0154861 | A1 | 10/2002 | Nara et al. |
| 2003/0117691 | A1 | 6/2003 | Bi et al. |
| 2004/0087049 | A1 | 5/2004 | Gill et al. |
| 2005/0264811 | A1 | 12/2005 | Bi et al. |
| 2005/0281505 | A1 | 12/2005 | Smith |
| 2006/0088246 | A1 | 4/2006 | Han et al. |
| 2006/0279732 | A1 | 12/2006 | Wang et al. |
| 2006/0279734 | A1 * | 12/2006 | Yan ................... G02B 6/12011 356/329 |
| 2009/0316159 | A1 | 12/2009 | Scott |
| 2010/0158445 | A1 | 6/2010 | Kim et al. |
| 2010/0261280 | A1 | 10/2010 | Black et al. |
| 2011/0096326 | A1 | 4/2011 | Crafts et al. |
| 2014/0212088 | A1 | 7/2014 | Ohira et al. |
| 2015/0055137 | A1 * | 2/2015 | Brown ............... G01B 9/02054 356/479 |
| 2015/0260919 | A1 | 9/2015 | Sun |

FOREIGN PATENT DOCUMENTS

| | | |
|---|---|---|
| KR | 10-2010-0008034 A | 1/2010 |
| KR | 10-2010-0073244 A | 7/2010 |

* cited by examiner

[FIG. 1]
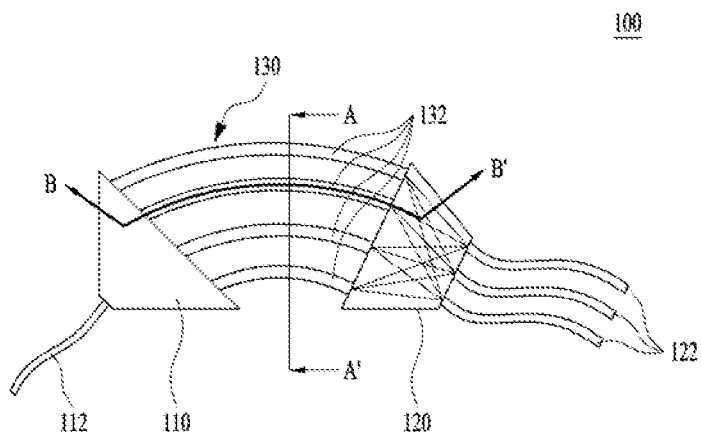
[FIG. 2a]
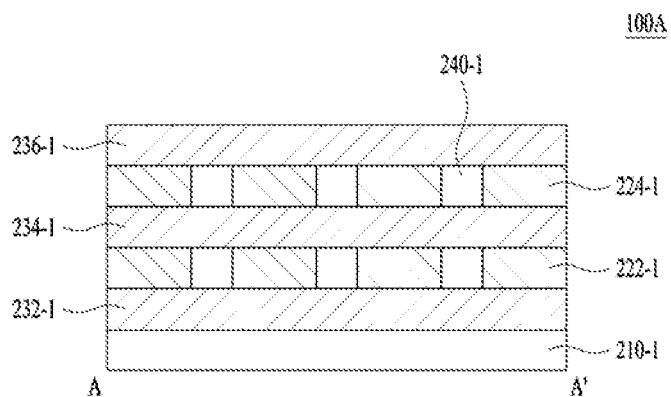
[FIG. 2b]
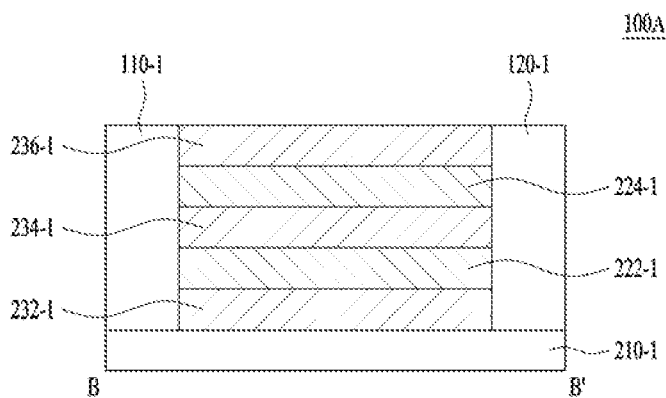

[FIG. 3a]
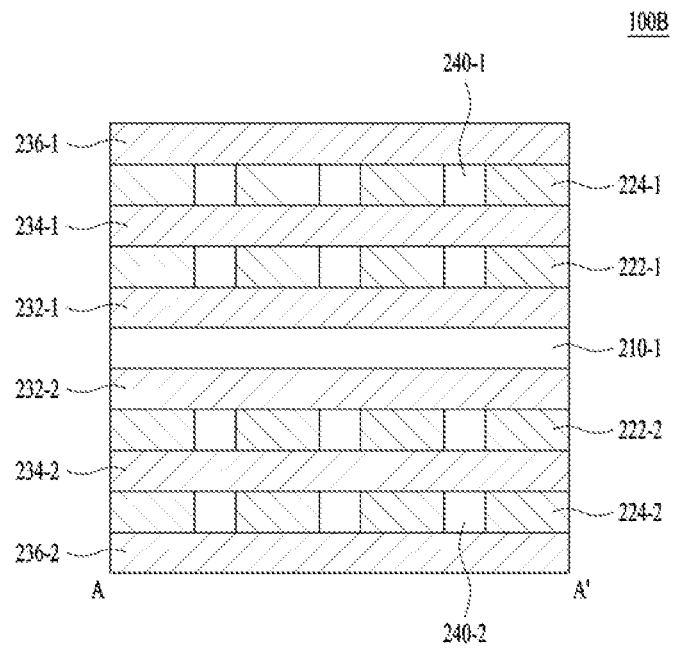
[FIG. 3b]
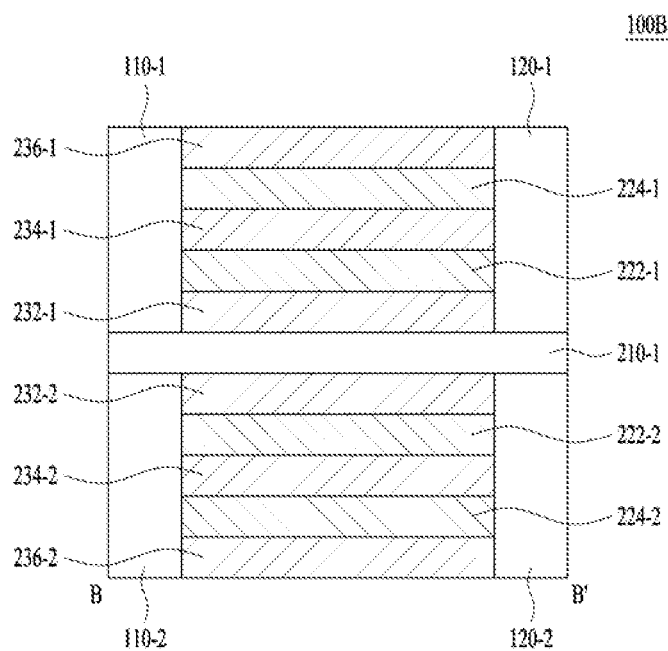

[FIG. 4a]
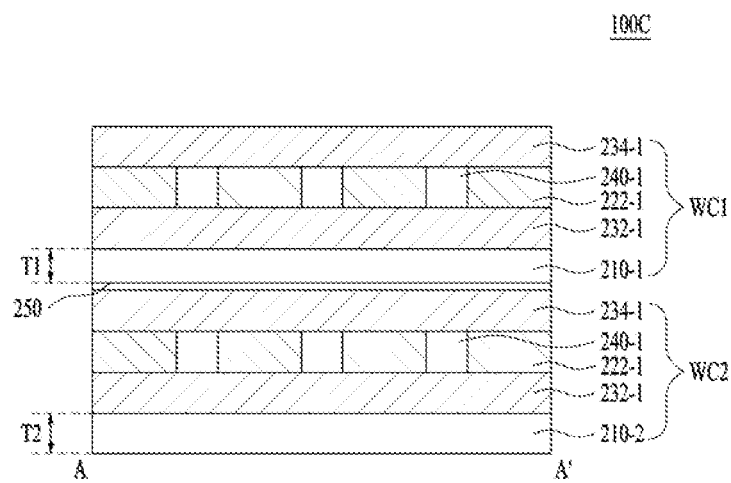
[FIG. 4b]
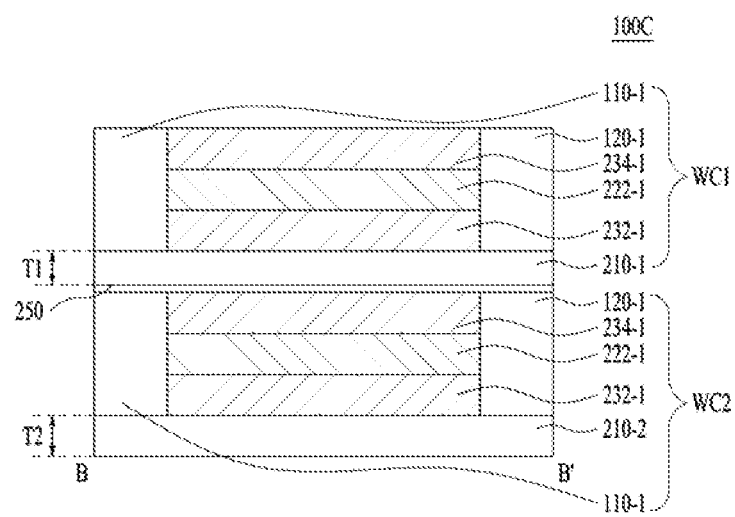
[FIG. 5a]

[FIG. 5b]
[FIG. 5c]
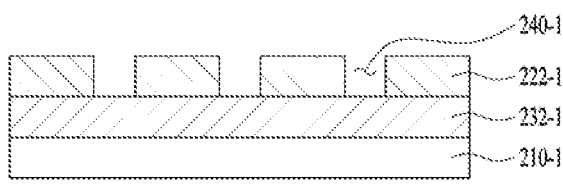
[FIG. 5d]
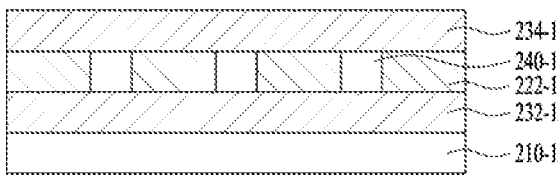
[FIG. 6a]
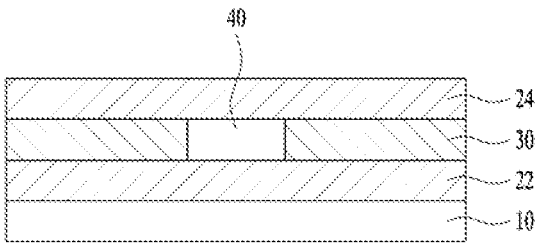
[FIG. 6b]
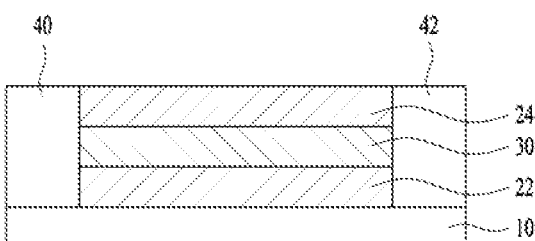

[FIG. 7]
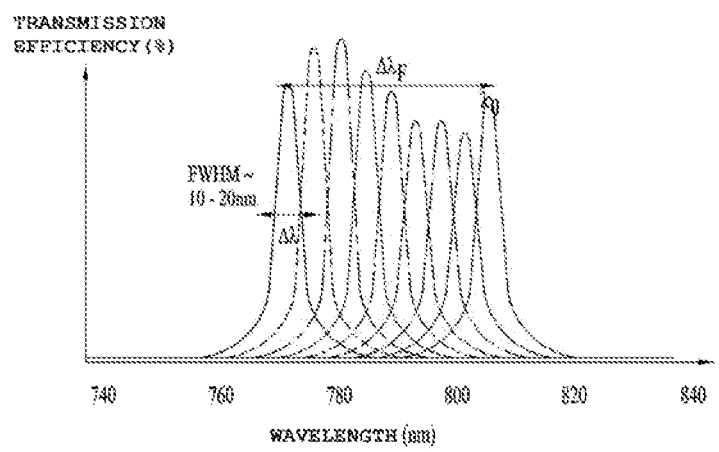
[FIG. 8]
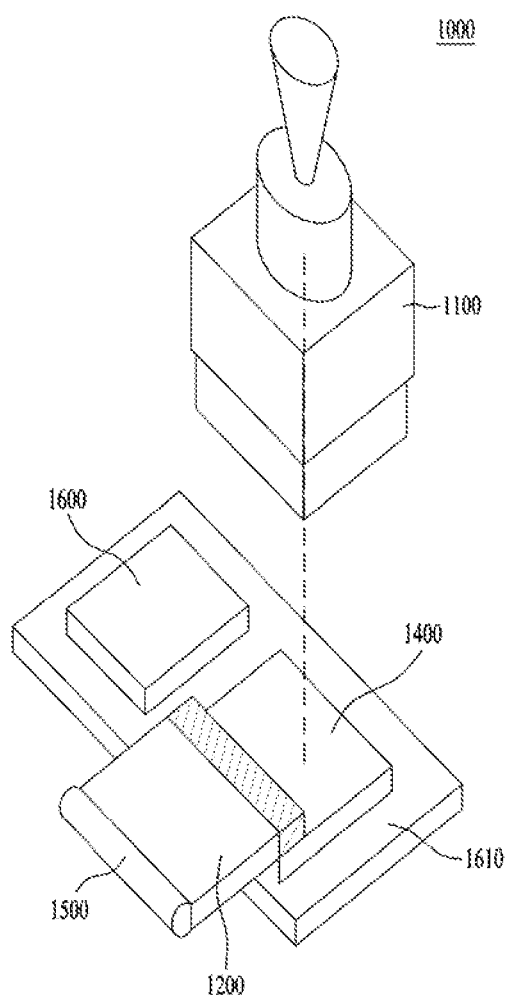

[FIG. 9]
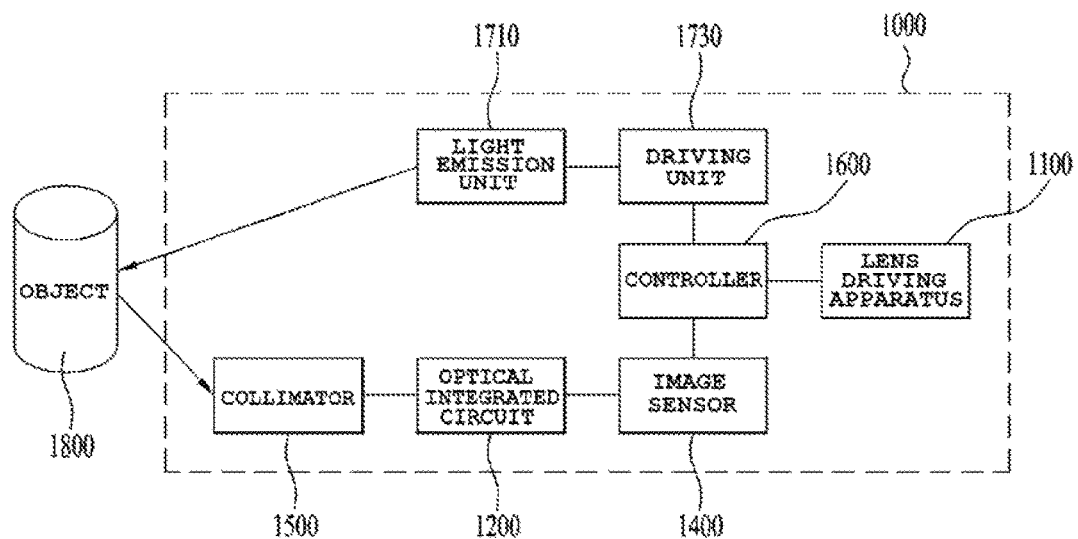
[FIG. 10]
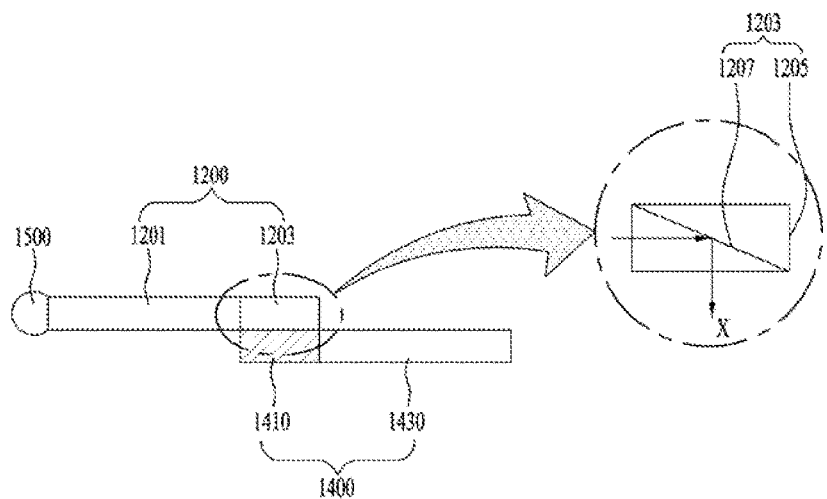

[FIG. 11]
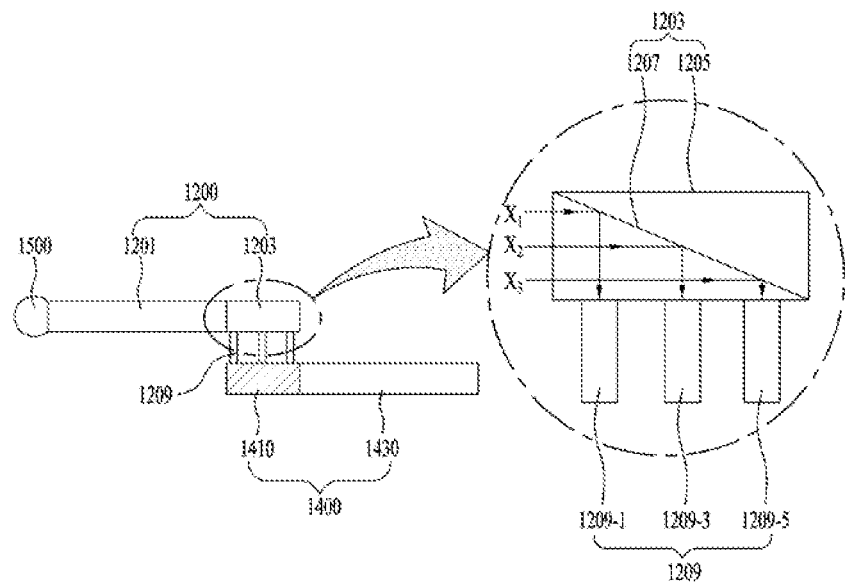
[FIG. 12]
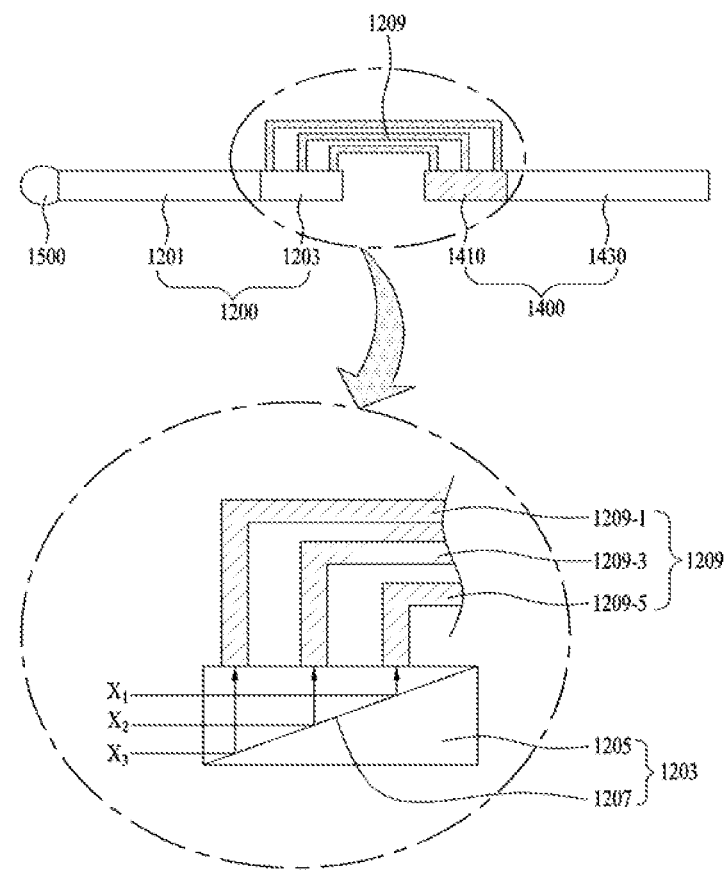

[FIG. 13]
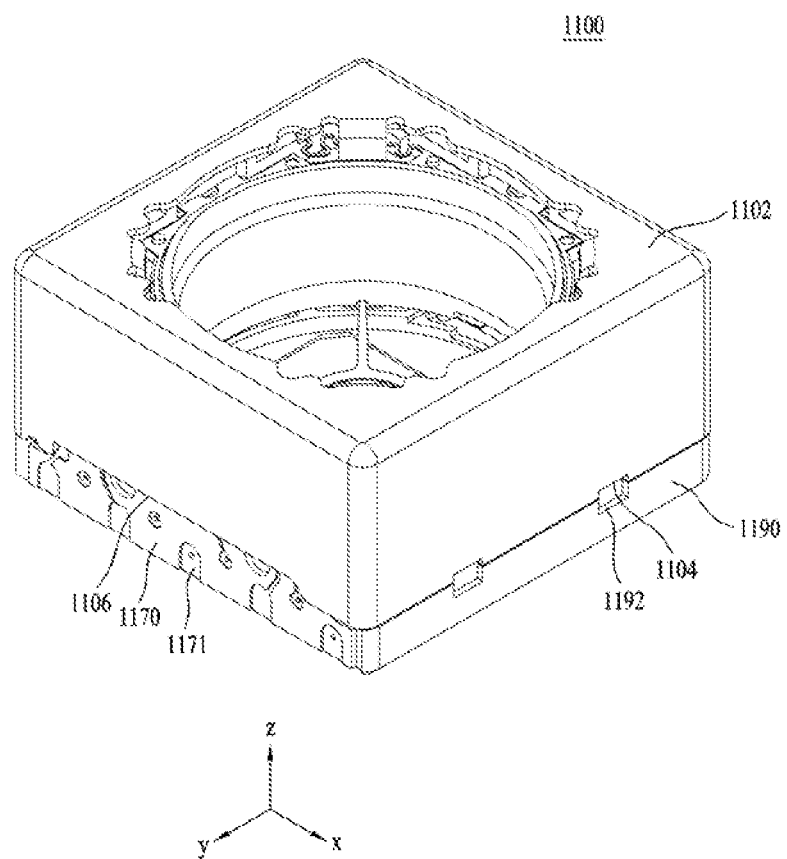

[FIG. 14]
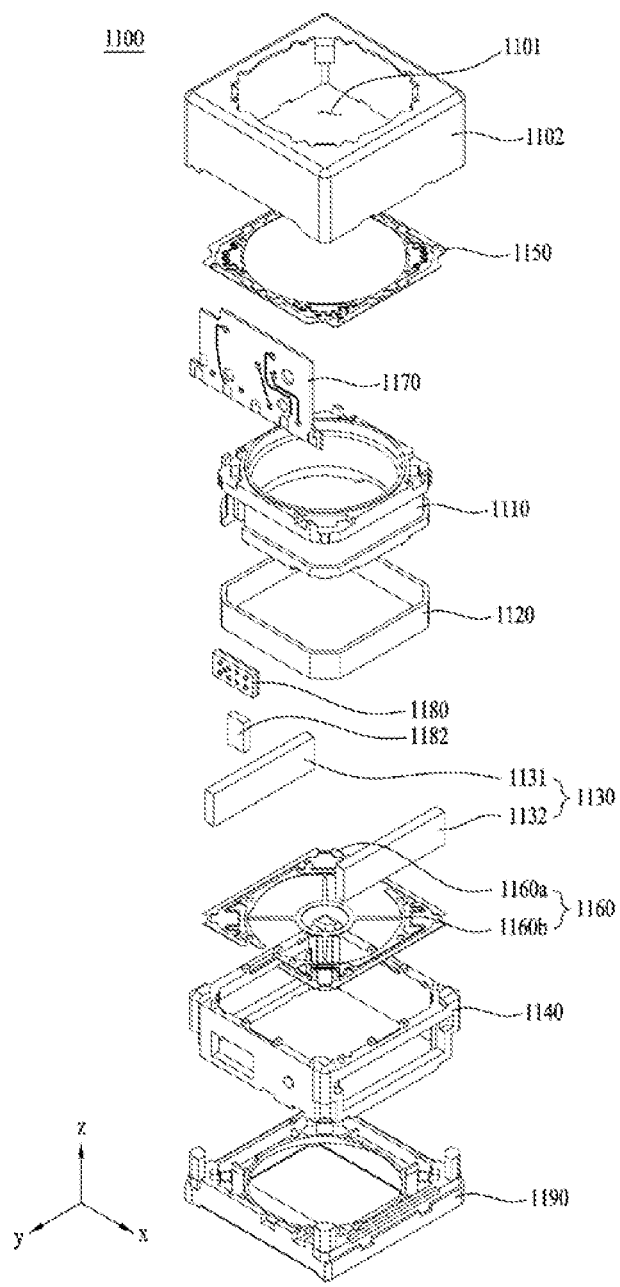

[FIG. 15]
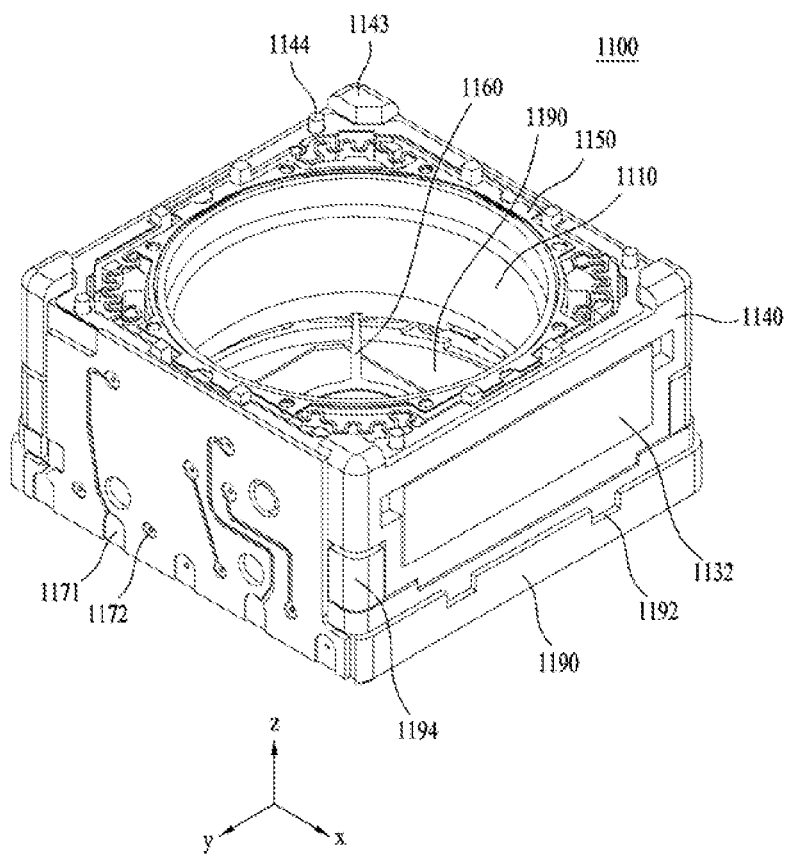
[FIG. 16]
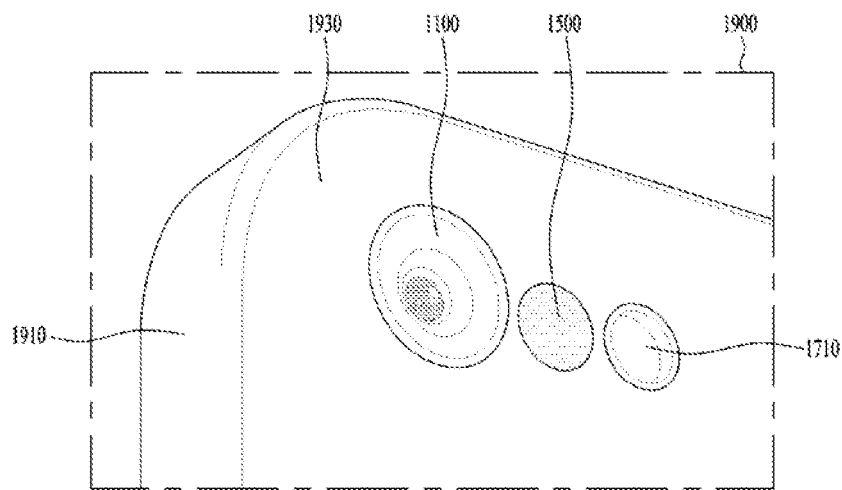

OPTICAL ARRAY WAVEGUIDE GRATING-TYPE MULTIPLEXER AND DEMULTIPLEXER AND CAMERA MODULE COMPRISING THE SAME

CROSS REFERENCE TO RELATED APPLICATIONS

This application is a Continuation of copending U.S. application Ser. No. 15/578,966, filed on Dec. 1, 2017, which is the National Phase of PCT International Application No. PCT/KR2016/005860, filed on Jun. 2, 2016, which claims priority under 35 U.S.C. 119(a) to Patent Application No. 10-2015-0078624, filed in the Republic of Korea on Jun. 3, 2015, and to Patent Application No. 10-2015-0086339, filed in the Republic of Korea on Jun. 18, 2015, all of which are hereby expressly incorporated by reference into the present application.

TECHNICAL FIELD

Embodiments relate to an optical arrayed waveguide grating-type multiplexer and demultiplexer, a camera module including the same, and a mobile phone device including the module.

BACKGROUND ART

In optical communication, a wavelength multiplexer transmission method is used in order to transmit large amounts of information. In the wavelength multiplexer transmission method, lights having different wavelengths are multiplexed and transmitted.

In order to broaden the wavelength band of a conventional optical arrayed waveguide grating-type multiplexer and demultiplexer, it is inevitable to increase the size of the optical arrayed waveguide grating-type multiplexer and demultiplexer. In the case in which the size of the conventional optical arrayed waveguide grating-type multiplexer and demultiplexer is large, however, it is difficult to apply the multiplexer and demultiplexer to small-sized products, and costs are increased.

Meanwhile, a spectrometer is a device that measures the spectrum of light that is emitted or absorbed by a material. In addition to spectroscopic analysis, the spectrometer may be used to observe the microscopic structure of the material. Depending on the purpose thereof, light ranging from gamma rays to far-infrared rays is used.

An image sensor is an image sensing device, a representative example of which is a charged coupled device (CCD). In the CCD, more than a hundred thousand sensing elements are included in a coin-sized chip, and an image focused on the surface of the chip is accumulated as a charge packet on each element. These packets are output by a charge transmission device at high speed, converted, processed, and displayed as an image. The elements of the CCD constitute a detection array, which is divided into regions for accumulation and output.

A conventional spectrometer is large-sized, making it difficult for a user to use the spectrometer in a portable manner in our daily lives. In addition, a conventional image sensor acquires only simple image information. In addition, a conventional mobile phone device includes only an image sensor, whereby only simple image information is acquired.

DISCLOSURE

Technical Problem

An embodiment provides an optical arrayed waveguide grating-type multiplexer and demultiplexer provided with a wide wavelength band without increasing the size thereof.

Another embodiment provides a camera module that is capable of simultaneously displaying image information, acquired using a lens driving apparatus, and physical property information, acquired using a spectrometer, to a user.

Technical Solution

In one embodiment, an optical arrayed waveguide grating-type multiplexer and demultiplexer may include a first substrate, a plurality of first waveguides disposed on the first substrate so as to overlap each other in a vertical direction, which is the thickness direction of the first substrate, a 1-1 cladding layer disposed between a 1-1 waveguide, which is the one of the first waveguides that is closest to the first substrate, and the first substrate, a 1-2 cladding layer disposed between the first waveguides, and a 1-3 cladding layer disposed on a 1-2 waveguide, which is the one of the first waveguides that is farthest from the first substrate.

For example, the multiplexer and demultiplexer may further include at least one first core disposed in each of the first waveguides.

For example, the multiplexer and demultiplexer may further include 1-1 and 1-2 free propagation regions disposed on the first substrate so as to be spaced apart from each other in a horizontal direction, which is perpendicular to the vertical direction, wherein the 1-1, 1-2, and 1-3 cladding layers and the first waveguides may be disposed between the 1-1 and 1-2 free propagation regions.

For example, the multiplexer and demultiplexer may further include at least one second waveguide disposed under the first substrate in the vertical direction, a 2-1 cladding layer disposed between the at least one second waveguide and the first substrate, and a 2-2 cladding layer disposed under the at least one second waveguide. The at least one second waveguide may include a plurality of second waveguides, and the multiplexer and demultiplexer may further include a 2-3 cladding layer disposed between the second waveguides.

For example, the multiplexer and demultiplexer may further include at least one second core disposed in each of the second waveguides.

For example, the multiplexer and demultiplexer may further include 2-1 and 2-2 free propagation regions disposed under the first substrate so as to be spaced apart from each other in a horizontal direction, which is perpendicular to the vertical direction, wherein the 2-1 and 2-2 cladding layers and the at least one second waveguide may be disposed between the 2-1 and 2-2 free propagation regions. The number of second waveguides that overlap each other in the vertical direction may be equal to or different from the number of first waveguides that overlap each other in the vertical direction.

In another embodiment, an optical arrayed waveguide grating-type multiplexer and demultiplexer may include a plurality of waveguide cells disposed so as to overlap each other in a vertical direction, wherein each of the waveguide cells may include a substrate, a plurality of cladding layers disposed on the substrate, and a waveguide disposed between the cladding layers.

For example, the thickness of the substrate included in a first waveguide cell, which is an upper one of the waveguide cells, may be less than the thickness of the substrate included in a second waveguide cell, which is a lower one of the waveguide cells.

For example, each of the waveguide cells may further include at least one third core disposed in the waveguide. Each of the waveguide cells may further include 3-1 and 3-2 free propagation regions disposed on the substrate so as to be spaced apart from each other in a horizontal direction, which is perpendicular to the vertical direction, and the cladding layers and the waveguide may be disposed between the 3-1 and 3-2 free propagation regions.

For example, the multiplexer and demultiplexer may further include a joining unit for joining the waveguide cells to each other. The at least one first, second, or third core may include a total reflective material.

In another embodiment, a camera module may include a lens driving apparatus for collecting image information of an object, a spectrometer for collecting physical property information of the object, and an image sensor for processing the image information of the object collected by the lens driving apparatus and the physical property information of the object collected by the spectrometer.

In addition, the spectrometer may include a light emission unit for emitting light to the object, a collimator for collecting and aligning reflected light generated as the result of the light emitted from the light emission unit and being reflected by the object, and an optical integrated circuit for splitting the reflected light aligned by the collimator.

In addition, the camera module may further include a total reflection unit for changing the optical path of the reflected light split by the optical integrated circuit.

In addition, the collimator may be disposed at one end of the optical integrated circuit, and the total reflection unit may be disposed at the other end of the optical integrated circuit.

In addition, the collimator, the optical integrated circuit, and the total reflection unit may be disposed in the same plane.

In addition, the image sensor may include a camera sensor unit for processing the image information of the object collected by the lens driving apparatus and a spectrometer sensor unit for processing the physical property information of the object collected by the spectrometer.

In addition, the spectrometer sensor unit may be disposed so as to be in contact with the lower surface of the total reflection unit. Alternatively, the spectrometer sensor unit may be disposed under the total reflection unit so as to be spaced apart from the total reflection unit by a predetermined distance.

In a further embodiment, a mobile phone device may include a mobile phone device housing defining an external appearance thereof and a camera module mounting unit disposed at one surface of the mobile phone device housing for allowing a camera module to be mounted therein, wherein the camera module may include a lens driving apparatus for collecting image information of an object, a spectrometer for collecting physical property information of the object, and an image sensor for processing the image information of the object collected by the lens driving apparatus and the physical property information of the object collected by the spectrometer.

In addition, the spectrometer may include a light emission unit for emitting light to the object, a collimator for collecting and aligning reflected light generated as the result of the light emitted from the light emission unit and being reflected by the object, and an optical integrated circuit for splitting the reflected light aligned by the collimator.

In addition, the mobile phone device may further include a total reflection unit for changing the optical path of the reflected light split by the optical integrated circuit.

In addition, the collimator may be disposed at one end of the optical integrated circuit, and the total reflection unit may be disposed at the other end of the optical integrated circuit.

In addition, the image sensor may include a camera sensor unit for processing the image information of the object collected by the lens driving apparatus and a spectrometer sensor unit for processing the physical property information of the object collected by the spectrometer.

Advantageous Effects

An optical arrayed waveguide grating-type multiplexer and demultiplexer according to an embodiment may be provided with a wide wavelength band without increasing the size thereof.

A camera module according to another embodiment and a mobile phone device including the same may simultaneously display image information, acquired using a lens driving apparatus, and physical property information, acquired using a spectrometer, to a user.

DESCRIPTION OF DRAWINGS

FIG. 1 is a view schematically showing the external appearance of an optical arrayed waveguide grating-type multiplexer and demultiplexer according to an embodiment;

FIG. 2a is a sectional view showing an embodiment of the optical arrayed waveguide grating-type multiplexer and demultiplexer taken along line A-A' of FIG. 1, and FIG. 2b is a sectional view showing an embodiment of the optical arrayed waveguide grating-type multiplexer and demultiplexer taken along line B-B' of FIG. 1;

FIG. 3a is a sectional view showing another embodiment of the optical arrayed waveguide grating-type multiplexer and demultiplexer taken along line A-A' of FIG. 1, and FIG. 3b is a sectional view showing another embodiment of the optical arrayed waveguide grating-type multiplexer and demultiplexer taken along line B-B' of FIG. 1;

FIG. 4a is a sectional view showing a further embodiment of the optical arrayed waveguide grating-type multiplexer and demultiplexer taken along line A-A' of FIG. 1, and FIG. 4b is a sectional view showing a further embodiment of the optical arrayed waveguide grating-type multiplexer and demultiplexer taken along line B-B' of FIG. 1;

FIGS. 5a to 5d are process sectional views illustrating a method of manufacturing the optical arrayed waveguide grating-type multiplexer and demultiplexer shown in FIG. 2a;

FIGS. 6a and 6b are sectional views showing an optical arrayed waveguide grating-type multiplexer and demultiplexer according to a comparative example;

FIG. 7 is a graph showing transmission efficiency for each wavelength;

FIG. 8 is a perspective view showing a camera module according to an embodiment;

FIG. 9 is a block diagram of the camera module according to the embodiment;

FIG. 10 is a view showing an embodiment in which a collimator, an optical integrated circuit, and an image sensor are coupled to each other;

FIG. 11 is a view showing another embodiment in which a collimator, an optical integrated circuit, and an image sensor are coupled to each other;

FIG. 12 is a view of a still another embodiment in which a collimator, an optical integrated circuit, and an image sensor are coupled to each other;

FIG. 13 is a perspective view schematically showing a lens driving apparatus according to an embodiment;

FIG. 14 is an exploded perspective view schematically showing the lens driving apparatus shown in FIG. 13;

FIG. 15 is a perspective view schematically showing the lens driving apparatus of FIG. 13, from which a cover can has been removed; and FIG. 16 is a partial perspective showing the external appearance of a mobile phone device including the camera module according to the embodiment.

BEST MODE

Reference will now be made in detail to preferred embodiments, examples of which are illustrated in the accompanying drawings. However, the embodiments may be modified into various other forms. The embodiments are not restrictive but are illustrative. The embodiments are provided to more completely explain the disclosure to a person having ordinary skill in the art.

It will be understood that when an element is referred to as being "on" or "under" another element, it can be directly on/under the element, or one or more intervening elements may also be present. In addition, when an element is referred to as being "on" or "under," "under the element" as well as "on the element" may be included based on the element.

In addition, relational terms, such as "first," "second," "on/upper part/above" and "under/lower part/below," are used only to distinguish between one subject or element and another subject or element, without necessarily requiring or involving any physical or logical relationship or sequence between such subjects or elements.

In the drawings, the thicknesses or sizes of respective layers are exaggerated, omitted, or schematically illustrated for convenience and clarity of description. Further, the sizes of the respective elements do not denote the actual sizes thereof.

Hereinafter, an optical arrayed waveguide grating-type multiplexer and demultiplexer according to an embodiment will be described.

FIG. 1 is a view schematically showing the external appearance of an optical arrayed waveguide grating-type multiplexer and demultiplexer 100 according to an embodiment.

The optical arrayed waveguide grating-type multiplexer and demultiplexer 100 shown in FIG. 1 may include a first slap waveguide (or an input mixing region) 110, an input waveguide 112, a second slap waveguide (or an output mixing region) 120, output waveguides 122, and a waveguide array 130.

In the case in which the optical arrayed waveguide grating-type multiplexer and demultiplexer 100 operates as a demultiplexer for splitting light, the first slap waveguide 110 may serve as the input side of the optical arrayed waveguide grating-type multiplexer and demultiplexer 100. On the other hand, in the case in which the optical arrayed waveguide grating-type multiplexer and demultiplexer 100 operates as a multiplexer for combining light, the first slap waveguide 110 may serve as the output side of the optical arrayed waveguide grating-type multiplexer and demultiplexer 100.

In the case in which the optical arrayed waveguide grating-type multiplexer and demultiplexer 100 operates as a demultiplexer, the second slap waveguide 120 may serve as the output side of the optical arrayed waveguide grating-type multiplexer and demultiplexer 100. On the other hand, in the case in which the optical arrayed waveguide grating-type multiplexer and demultiplexer 100 operates as a multiplexer for combining light, the second slap waveguide 120 may serve as the input side of the optical arrayed waveguide grating-type multiplexer and demultiplexer 100.

A single input waveguide 112 for receiving light is connected to the input side of the first slap waveguide 110. In contrast, a plurality of output waveguides 122 for transmitting light may extend from the output side of the second slap waveguide 120.

The waveguide array 130 may include a plurality of waveguides 132. The waveguides 132 may be arranged in parallel and may be formed in a 'U' shape. Light received through the input waveguide 112 is transmitted to the second slap waveguide 120 via the waveguides 132.

In order for the waveguides 132 and the output waveguides 122 to propagate light, the refractive indices of the waveguides 132 and the output waveguides 122 may be higher than those of first and second cladding layers, descriptions of which will follow. In addition, the waveguides 132 and the output waveguides 122 may be made of the same material. That is, the waveguides 132 and the output waveguides 122 may have the same refractive index.

In addition, the waveguides 132 and the output waveguides 122 may be made of a transparent material, e.g. transparent plastic.

In addition, adjacent ones of the waveguides 132 may have different lengths. For example, adjacent ones 132 of the waveguides 132 may have a length difference of ΔL.

In FIG. 1, the number of waveguides 132 included in the waveguide array 130 is shown as being 4. However, the disclosure is not limited thereto. That is, the number of waveguides 132 may be greater than or less than 4.

The first slap waveguide 110 is disposed at the input side of the waveguide array 130, and the second slap waveguide 120 is disposed at the output side of the waveguide array 130.

While light exiting from the first slap waveguide 110 is transmitted to the second slap waveguide 120 via the waveguide array 130, the phase may be changed for each wavelength. Subsequently, while the light passes through the second slap waveguide 120, the light may be split by respective wavelengths.

FIG. 2a is a sectional view showing an embodiment 100A of the optical arrayed waveguide grating-type multiplexer and demultiplexer 100 taken along line A-A' of FIG. 1, and FIG. 2b is a sectional view showing an embodiment 100A of the optical arrayed waveguide grating-type multiplexer and demultiplexer 100 taken along line B-B' of FIG. 1.

Referring to FIGS. 2a and 2b, the optical arrayed waveguide grating-type multiplexer and demultiplexer 100A may include a first substrate 210-1, a plurality of first waveguides 222-1 and 224-1, a plurality of first cladding layers 232-1, 234-1, and 236-1, and 1-1 and 1-2 free propagation regions (FPRs) 110-1 and 120-1.

The first waveguides 222-1 and 224-1 may be disposed on the first substrate 210-1 so as to overlap each other in a vertical direction. Here, the vertical direction may be the thickness direction of the first substrate 210-1.

The first substrate 210-1 may be made of silicon. However, the disclosure is not limited to any specific material for the first substrate 210-1.

The first waveguides 222-1 and 224-1 may include a 1-1 waveguide 222-1 and a 1-2 waveguide 224-1. In FIGS. 2a and 2b, the number of first waveguides is shown as being 2. However, the disclosure is not limited thereto. That is, the following description may also apply to the case in which the number of first waveguides is 3 or more.

Here, the 1-1 waveguide 222-1 is defined as the one of the first waveguides that is closest to the first substrate 210-1, and the 1-2 waveguide 224-1 is defined as the one of the first waveguides that is farthest from the first substrate 210-1. That is, the 1-2 waveguide 224-1 may be defined as the one of the first waveguides that is located at the highest position.

Meanwhile, the first cladding layers may include a 1-1 cladding layer 232-1, a 1-2 cladding layer 234-1, and a 1-3 cladding layer 236-1. In FIGS. 2a and 2b, the number of first cladding layers is shown as being 3. However, the disclosure is not limited thereto. That is, the following description may also apply to the case in which the number of first cladding layers is 4 or more.

The 1-1 cladding layer 232-1 may be disposed between the 1-1 waveguide 222-1 and the first substrate 210-1.

The 1-2 cladding layer 234-1 may be disposed between the first waveguides. For example, in the case in which the number of first waveguides is 2, as shown in FIGS. 2a and 2b, the 1-2 cladding layer 234-1 may be disposed between the 1-1 waveguide 222-1 and the 1-2 waveguide 224-1. In FIGS. 2a and 2b, the number of first waveguides is 2, and therefore a single 1-2 cladding layer 234-1 is provided. In the case in which the number of first waveguides is 3, however, two 1-2 cladding layers 234-1 may be provided.

The 1-3 cladding layer 236-1 may be disposed on the 1-2 waveguide 224-1.

Each of the 1-1 to 1-3 cladding layers 232-1, 234-1, and 236-1 may be plate-shaped. However, the disclosure is not limited to any specific shape of the 1-1 to 1-3 cladding layers 232-1, 234-1, and 236-1. In addition, each of the first cladding layers 232-1, 234-1, and 236-1 may be made of a transparent material, e.g. transparent plastic. Alternatively, each of the first cladding layers 232-1, 234-1, and 236-1 may be made of polymer or $SiO_2$. In addition, the first cladding layers 232-1, 234-1, and 236-1 may be made of a material that has a refractive index less than the refractive index of the waveguides 132 or the output waveguides 122.

In addition, referring to FIG. 2b, the 1-1 and 1-2 free propagation regions 110-1 and 120-1 may be disposed on the first substrate 210-1 so as to be spaced apart from each other in a horizontal direction, which is perpendicular to the vertical direction. Here, the 1-1 and 1-2 free propagation regions 110-1 and 120-1 may correspond respectively to the first and second slap waveguides 110 and 120 shown in FIG. 1.

The first cladding layers 232-1, 234-1, and 236-1 and the first waveguides 222-1 and 224-1 may be disposed between the 1-1 and 1-2 free propagation regions 110-1 and 120-1.

In addition, the optical arrayed waveguide grating-type multiplexer and demultiplexer 100A shown in FIGS. 2a and 2b may further include at least one first core 240-1 disposed in each of the first waveguides 222-1 and 224-1.

FIG. 3a is a sectional view showing another embodiment 100B of the optical arrayed waveguide grating-type multiplexer and demultiplexer 100 taken along line A-A' of FIG. 1, and FIG. 3b is a sectional view showing another embodiment 100B of the optical arrayed waveguide grating-type multiplexer and demultiplexer 100 taken along line B-B' of FIG. 1.

Referring to FIGS. 3a and 3b, the optical arrayed waveguide grating-type multiplexer and demultiplexer 100B may include a first substrate 210-1, a plurality of first waveguides 222-1 and 224-1, a plurality of second waveguides 222-2 and 224-2, a plurality of first cladding layers 232-1, 234-1, and 236-1, a plurality of second cladding layers 232-2, 234-2, and 236-2, 1-1 and 1-2 free propagation regions (FPRs) 110-1 and 120-1, and 2-1 and 2-2 free propagation regions 110-2 and 120-2.

When compared with the optical arrayed waveguide grating-type multiplexer and demultiplexer 100A shown in FIGS. 2a and 2b, the optical arrayed waveguide grating-type multiplexer and demultiplexer 100B shown in FIGS. 3a and 3b further includes a plurality of second waveguides 222-2 and 224-2, a plurality of second cladding layers 232-2, 234-2, and 236-2, and 2-1 and 2-2 free propagation regions 110-2 and 120-2. With the above exception, the optical arrayed waveguide grating-type multiplexer and demultiplexer 100B shown in FIGS. 3a and 3b is identical to the optical arrayed waveguide grating-type multiplexer and demultiplexer 100A shown in FIGS. 2a and 2b. Therefore, the same reference numerals are used, and a duplicate description thereof will be omitted.

The first waveguides 222-1 and 224-1, the first cladding layers 232-1, 234-1, and 236-1, and the 1-1 and 1-2 free propagation regions 110-1 and 120-1 are disposed on the first substrate 210-1 in the vertical direction, in the same manner as in FIGS. 2a and 2b.

In the optical arrayed waveguide grating-type multiplexer and demultiplexer 100B shown in FIGS. 3a and 3b, at least one second waveguide may be further disposed under the first substrate 210-1 in the vertical direction. The at least one second waveguide may include a 2-1 waveguide 222-2 and a 2-2 waveguide 224-2. In FIGS. 3a and 3b, the number of second waveguides is shown as being 2. However, the disclosure is not limited thereto. That is, in another embodiment, the number of second waveguides may be less than or greater than 2, and the following description may also apply to this case.

Here, the 2-1 waveguide 222-2 is defined as the one of the second waveguides that is closest to the first substrate 210-1, and the 2-2 waveguide 224-2 is defined as the one of the second waveguides that is farthest from the first substrate 210-1. That is, the 2-2 waveguide 224-2 may be defined as the one of the second waveguides that is located at the lowest position.

In addition, at least one second core 240-2 may be disposed in each of the second waveguides 222-2 and 224-2.

Meanwhile, the second cladding layers may include a 2-1 cladding layer 232-2 and a 2-2 cladding layer 236-2. The 2-1 cladding layer 232-2 may be disposed between the 2-1 waveguide 222-2 and the first substrate 210-1. The 2-2 cladding layer 236-2 may be disposed under the 2-2 waveguide 224-2.

Also, in the case in which a plurality of second waveguides is provided, the second cladding layers may further include a 2-3 cladding layer 234-2. The 2-3 cladding layer 234-2 may be disposed between the second waveguides. For example, in the case in which the number of second waveguides is 2, as shown in FIGS. 3a and 3b, the 2-3 cladding layer 234-2 may be disposed between the 2-1 waveguide 222-2 and the 2-2 waveguide 224-2. In FIGS. 3a and 3b, the number of second waveguides is 2, and therefore a single 2-3 cladding layer 234-2 is provided. In the case in which the number of second waveguides is 1, however, the 2-3 cladding layer 234-2 may be omitted.

In FIGS. 3a and 3b, the number of second cladding layers is shown as being 3. However, the disclosure is not limited thereto. That is, the following description may also apply to the case in which the number of second cladding layers is less than or greater than 3.

In addition, referring to FIG. 3b, the 2-1 and 2-2 free propagation regions 110-2 and 120-2 may be disposed under the first substrate 210-1 so as to be spaced apart from each other in the horizontal direction, which is perpendicular to the vertical direction.

The second cladding layers 232-2, 236-2, and 234-2 and the second waveguides 222-2 and 224-2 may be disposed between the 2-1 and 2-2 free propagation regions 110-2 and 120-2.

The 2-1 and 2-2 free propagation regions 110-2 and 120-2 may correspond respectively to the first and second slap waveguides 110 and 120 shown in FIG. 1 in the same manner as the 1-1 and 1-2 free propagation regions 110-1 and 120-1.

In addition, the number of second waveguides that overlap each other in the vertical direction may be equal to the number of first waveguides that overlap each other in the vertical direction. For example, referring to FIGS. 3a and 3b, it can be seen that the number of second waveguides 222-2 and 224-2 that overlap each other in the vertical direction, which is 2, is equal to the number of first waveguides 222-1 and 224-1 that overlap each other in the vertical direction, which is 2.

Alternatively, the number of second waveguides that overlap each other in the vertical direction may be different from the number of first waveguides that overlap each other in the vertical direction. For example, unlike what is shown in FIGS. 3a and 3b, the number of second waveguides that overlap each other in the vertical direction may be less than the number of first waveguides that overlap each other in the vertical direction.

FIG. 4a is a sectional view showing still another embodiment 100C of the optical arrayed waveguide grating-type multiplexer and demultiplexer 100 taken along line A-A' of FIG. 1, and FIG. 4b is a sectional view showing still another embodiment 100C of the optical arrayed waveguide grating-type multiplexer and demultiplexer 100 taken along line B-B' of FIG. 1.

Referring to FIGS. 4a and 4b, the optical arrayed waveguide grating-type multiplexer and demultiplexer 100C may include a plurality of waveguide cells WC1 and WC2 disposed so as to overlap each other in the vertical direction. Here, a description will be given on the assumption that the number of waveguide cells is 2. However, the following description may also apply to the case in which the number of waveguide cells is greater than 2.

Each of the waveguide cells WC1 and WC2 may include a substrate 210-1 or 210-2, a plurality of cladding layers 232-1 and 234-1, at least one waveguide 222-1, and 3-1 and 3-2 free propagation regions 110-1 and 120-1.

When compared with the optical arrayed waveguide grating-type multiplexer and demultiplexer 100A shown in FIGS. 2a and 2b, each of the waveguide cells WC1 and WC2 shown in FIGS. 4a and 4b does not include the 1-2 waveguide 224-1 or the 1-3 cladding layer 236-1. With the above exception, each of the waveguide cells WC1 and WC2 shown in FIGS. 4a and 4b is identical to the optical arrayed waveguide grating-type multiplexer and demultiplexer 100A shown in FIGS. 2a and 2b. Therefore, the same reference numerals are used, and a duplicate description thereof will be briefly set forth below.

That is, in the same manner as that in which each of the first waveguides 222-1 and 224-1 includes at least one first core 240-1 in the optical arrayed waveguide grating-type multiplexer and demultiplexer 100A shown in FIGS. 2a and 2b, the waveguide 222-1 may further include at least one third core 240-1 in each of the waveguide cells WC1 and WC2 shown in FIG. 4a.

The first, second, or third core 240-1 or 240-2 shown in FIG. 2a, 3a, or 4a, may be filled with air or a total reflective material. In the case in which the first, second, or third core 240-1 or 240-2 is filled with a total reflective material, light propagated through the first waveguides 222-1 and 224-1 or the second waveguides 222-2 and 224-2 may be totally reflected by the first, second, or third core 240-1 or 240-2, thereby minimizing the loss of light.

Also, in the same manner as that in which the optical arrayed waveguide grating-type multiplexer and demultiplexer 100A shown in FIG. 2a includes 1-1 and 1-2 free propagation regions 110-1 and 120-1, each of the waveguide cells WC1 and WC2 shown in FIG. 4b may include 3-1 and 3-2 free propagation regions 110-1 and 120-1 disposed on the substrate 210-1 or 210-2 so as to be spaced apart from each other in the horizontal direction. The 3-1 and 3-2 free propagation regions 110-1 and 120-1 are identical to the aforementioned 1-1 and 1-2 free propagation regions 110-1 and 120-1, respectively, and therefore a duplicate description thereof will be omitted.

In addition, a first thickness T1 of the substrate 210-1 included in the first waveguide cell WC1, which is the upper one of the waveguide cells WC1 and WC2, may be less than a second thickness T2 of the substrate 210-2 included in the second waveguide cell WC2, which is the lower one of the waveguide cells WC1 and WC2. To this end, the lower surface of the substrate 210-1 may be ground before the first waveguide cell WC1 is stacked on the second waveguide cell WC2.

In addition, the lower surface of the substrate 210-2 included in the second waveguide cell WC2 may be ground to reduce the second thickness T2 of the substrate 210-2.

In addition, the waveguide cells WC1 and WC2 may be joined to each other using a joining unit 250.

In the case in which the waveguide cells WC1 and WC2 are disposed so as to overlap each other in the vertical direction via the joining unit 250, as shown in FIGS. 4a and 4b, the process of manufacturing the optical arrayed waveguide grating-type multiplexer and demultiplexer 100C may be simplified.

Hereinafter, a method of manufacturing the optical arrayed waveguide grating-type multiplexer and demultiplexer 100A shown in FIG. 2a will be described with reference to FIGS. 5a to 5d. However, the disclosure is not limited thereto. That is, the optical arrayed waveguide grating-type multiplexer and demultiplexer 100A shown in FIG. 2a may be manufacturing using methods other than the method shown in FIGS. 5a to 5d. Moreover, the optical arrayed waveguide grating-type multiplexer and demultiplexer 100A, 100B, or 100C shown in FIGS. 2a to 4b may be manufactured using the method shown in FIGS. 5a to 5d.

FIGS. 5a to 5d are process sectional views illustrating a method of manufacturing the optical arrayed waveguide grating-type multiplexer and demultiplexer 100A shown in FIG. 2a.

As shown in FIG. 5a, a 1-1 cladding layer 232-1 is formed on a first substrate 210-1. For example, the 1-1 cladding layer 232-1 may be formed on the first substrate 210-1 by thermal oxidation. However, the disclosure is not limited thereto. The first substrate 210-1 may be formed using silicon, and the 1-1 cladding layer 232-1 may be formed using polymer or $SiO_2$.

Subsequently, as shown in FIG. 5b, a material 222 for a 1-1 waveguide 222-1 is formed on the 1-1 cladding layer 232-1. For example, a material 222 having a relatively high refractive index, such as GeSiO$_2$, may be deposited on the 1-1 cladding layer 232-1 by chemical vapor deposition (CVD) in order to form the 1-1 waveguide 222-1.

Subsequently, as shown in FIG. 5c, a first core 240-1 is formed in the material 222 for the 1-1 waveguide 222-1. For example, the material 222 may be dry-etched by optical lithography in order to form the first core 240-1.

Subsequently, as shown in FIG. 5d, a 1-2 cladding layer 234-1 is formed on the 1-1 waveguide 222-1 having the first core 240-1 formed therein. For example, the 1-2 cladding layer 234-1 may be formed by chemical vapor deposition (CVD) using a material having a refractive index that matches that of the 1-1 cladding layer 232-1. However, the disclosure is not limited thereto.

In addition, the 1-2 cladding layer 234-1 may be formed using polymer or SiO$_2$.

Subsequently, the processes shown in FIGS. 5b to 5d are repeatedly performed in order to form a 1-1 waveguide 224-1, a first core 240-1, and a 1-3 cladding layer 236-1.

Hereinafter, an optical arrayed waveguide grating-type multiplexer and demultiplexer according to a comparative example and the optical arrayed waveguide grating-type multiplexer and demultiplexer according to each of the embodiments will be described with reference to the accompanying drawings.

FIGS. 6a and 6b are sectional views showing an optical arrayed waveguide grating-type multiplexer and demultiplexer according to a comparative example.

FIG. 6a is a sectional view showing a comparative example compared with FIG. 2a, which is a sectional view showing the optical arrayed waveguide grating-type multiplexer and demultiplexer 100 taken along line A-A' of FIG. 1, and FIG. 6b is a sectional view showing a comparative example compared with FIG. 2b, which is a sectional view showing the optical arrayed waveguide grating-type multiplexer and demultiplexer 100 taken along line B-B' of FIG. 1.

Referring to FIGS. 6a and 6b, the optical arrayed waveguide grating-type multiplexer and demultiplexer according to the comparative example includes a substrate 10, cladding layers 22 and 24, a waveguide 30, a core 40, and free propagation regions 40 and 42.

In the optical arrayed waveguide grating-type multiplexer and demultiplexer according to the comparative example shown in FIGS. 6a and 6b, it is necessary to increase the size of the optical arrayed waveguide grating-type multiplexer and demultiplexer in order to broaden the wavelength band thereof.

FIG. 7 is a graph showing transmission efficiency for each wavelength. The horizontal axis indicates a wavelength, and the vertical axis indicates transmission efficiency. Here, FWHM is an abbreviated form of Full Width at Half Maximum.

The width of the optical arrayed waveguide grating-type multiplexer and demultiplexer according to the comparative example increases in order to broaden a wavelength band as described by Equations 1 to 3 below.

$$\Delta\lambda_F = N\Delta\lambda \qquad \text{[Equation 1]}$$

Where $\Delta\lambda_F$ indicates the wavelength band of the optical arrayed waveguide grating-type multiplexer and demultiplexer according to the comparative example, N indicates the number of waveguides included in the waveguide array, and $\Delta\lambda$ indicates the wavelength band of each waveguide. In addition, $\Delta\lambda$ has the relationship represented by Equation 2 below.

$$\Delta x = \frac{m n_g L_f}{n_s n_c d}\Delta\lambda \qquad \text{[Equation 2]}$$

Where $\Delta x$ indicates spacing between waveguides of a waveguide array of the optical arrayed waveguide grating-type multiplexer and demultiplexer according to the comparative example, m indicates a diffraction order, $L_f$ indicates the focal length of the waveguide array, $n_s$ indicates an index in the slab guide, $n_c$ indicates an index in the arrayed guide, d indicates a pitch length, and $n_g$ indicates the refractive index of a group, which may be represented by Equation 3 below.

$$n_g = n_c - \lambda_0 \frac{dn_c}{d\lambda_0} \qquad \text{[Equation 3]}$$

Where $\lambda_0$ indicates a center wavelength shown in FIG. 7.

In the optical arrayed waveguide grating-type multiplexer and demultiplexer 100, 100A, 100B, or 100C according to each of the embodiments, on the other hand, the waveguides 222-1, 222-2, 224-1, and 224-2 are disposed so as to overlap each other in the vertical direction through a semiconductor process in order to broaden the wavelength band thereof, instead of increasing the size thereof in order to broaden the wavelength band thereof. In the case in which the waveguides are disposed so as to overlap each other in the vertical direction, as described above, it is possible to broaden the wavelength band of the optical arrayed waveguide grating-type multiplexer and demultiplexer without increasing the width of the optical arrayed waveguide grating-type multiplexer and demultiplexer, i.e. without increasing the size of the optical arrayed waveguide grating-type multiplexer and demultiplexer. As a result, the wavelength band of the optical arrayed waveguide grating-type multiplexer and demultiplexer 100, 100A, 100B, or 100C according to each of the embodiments is wider than that of the optical arrayed waveguide grating-type multiplexer and demultiplexer according to the comparative example, and the area occupied by the optical arrayed waveguide grating-type multiplexer and demultiplexer according to each of the embodiments is smaller than that of the optical arrayed waveguide grating-type multiplexer and demultiplexer according to the comparative example. Consequently, the optical arrayed waveguide grating-type multiplexer and demultiplexer according to each of the embodiments may be effectively used in a portable electronic device required to have a small size, such as a mobile cellular phone.

In addition, it is possible to broaden the wavelength band of the optical arrayed waveguide grating-type multiplexer and demultiplexer according to each of the embodiments without increasing the area thereof. Consequently, the size of a wafer may be relatively reduced compared to the comparative example, whereby it is possible to reduce costs. In addition, a photodiode is generally used as an image sensor. In this case, an area detector that secondarily uses a photodiode may be used, instead of a line detector that primarily uses a photodiode.

Hereinafter, a camera module according to another embodiment will be described with reference to the accompanying drawings.

FIG. 8 is a perspective view showing a camera module 1000 including a spectrometer according to an embodiment.

The camera module 1000 shown in FIG. 8 may include a lens driving apparatus 1100, an optical integrated circuit 1200, an image sensor 1400, a collimator 1500, a controller 1600, and a printed circuit board (PCB) 1610.

FIG. 9 is a block diagram of the camera module 1000 according to the embodiment.

The camera module 1000 shown in FIG. 9 may include a lens driving apparatus 1100, an optical integrated circuit 1200, an image sensor 1400, a collimator 1500, a controller 1600, a light emission unit 1710, and a driving unit 1730.

Hereinafter, FIG. 9 will be described as a block diagram of the camera module 1000 shown in FIG. 8 for the sake of convenience. In FIGS. 8 and 9, the same elements are denoted by the same reference numerals. However, the disclosure is not limited thereto. That is, the camera module 1000 according to the embodiment shown in FIG. 8 may be shown in a block diagram different from that shown in FIG. 9, and the camera module 1000 according to the embodiment shown in FIG. 9 may be shown in a perspective view different from that shown in FIG. 8.

In the lens driving apparatus 1100 shown in FIGS. 8 and 9, technology for transmitting image information of an object 1800 to the image sensor 1400 is obvious in the art to which the preset invention pertains, and therefore a detailed description thereof will be omitted.

Hereinafter, the respective elements of the camera module 1000 according to the embodiment shown in FIGS. 8 and 9 will be described.

The lens driving apparatus 1100 may serve to collect image information incident from the front of a lens. The image sensor 1400 may serve to process the image information incident on the lens driving apparatus 1100. The image sensor 1400 may be disposed on the PCB 1610.

The controller 1600 is disposed on the PCB 1610. The controller 1600 drives the lens driving apparatus 1100 and processes information acquired from the image sensor 1400.

The collimator 1500 serves to collect and align light incident thereon as the result of light emitted from the light emission unit 1710 being reflected by the object 1800.

The optical integrated circuit 1200 serves to split the light aligned by the collimator. The optical integrated circuit 1200 may acquire information about the physical properties of the object 1800 using light reflected after being incident on the object 1800.

In order to perform the above operation, the light emission unit 1710 emits light toward the object 1800, and the driving unit 1730 controls the light emission unit 1710.

In FIG. 8, only the image sensor 1400 and the controller 1600 are shown as being disposed on the PCB 1610 for the convenience of description. However, other elements may be further provided on the PCB 1610 as needed, which does not limit the scope of rights of the embodiment.

The lens driving apparatus 110 may transmit the image information incident from the object 1800 to the image sensor 1400, and the optical integrated circuit 1200, which serves as a spectrometer, may transmit light reflected by the object 1800 to a portion of the image sensor 1400.

That is, a camera module according to a comparative example processes image information using the entirety of the image sensor 1400. In the camera module 1000 according to the embodiment, on the other hand, the optical integrated circuit 1200 and the lens driving apparatus 1100 may share a predetermined portion of the image sensor 1400. As a result, the camera module 1000 according to the embodiment has the effect of providing both the 'image information' of the object acquired by the lens driving apparatus 1100 and the 'physical property information' acquired from the optical integrated circuit 1200, which serves as a spectrometer, to a user.

More specifically, the camera module 1000 according to the embodiment may collect information about physical properties, such as a number of calories, freshness, and moisture, of the object 1800, as well as the image information of the object 1800. To this end, the image sensor 1400 is needed. At least two image sensors 1400 are generally needed in order to acquire both the image information and the physical property information of the object 1800 using a single device.

If two image sensors 1400 are disposed in a single device, the size of the device is increased, whereby it is difficult for a user to carry the device.

On the other hand, the camera module 1000 according to the embodiment is capable of processing both the image information, acquired by the lens driving apparatus 1100, and the physical property information, acquired by the optical integrated circuit 1200, using a single image sensor 1400. Consequently, the device may be miniaturized, whereby it is possible for a user to carry the device.

The coupling structure for processing the information acquired by the lens driving apparatus 1100 and the information acquired by the optical integrated circuit 1200 using a single image sensor 1400 will be described below.

In addition, the spectrometer according to the embodiment acquires the physical property information of the object 1800 using the optical integrated circuit 1200. Consequently, it is possible to obtain relatively high resolution compared to the physical property analysis capability of a conventional spectrometer.

Hereinafter, a method by which the camera module 1000 acquires the physical property information of the object 1800 will be described with reference to FIGS. 8 and 9.

When the controller 1600 sends a signal to the driving unit 1730, which drives the light emission unit 1710, the driving unit 1730 may supply power to the light emission unit 1710 such that the light emission unit 1710 can emit light.

The light emitted by the light emission unit 1710 is reflected by the object 1800. The reflected light is incident without being aligned. The collimator 1500 aligns the reflected light and transmits the aligned reflected light to the optical integrated circuit 1200.

The aligned reflected light is split by the optical integrated circuit 1200 and is transmitted to the image sensor 1400.

The image sensor 1400 transmits information about the reflected light, received from the optical integrated circuit 1200, to the controller 1600, whereby the physical property information of the object 1800 may be displayed to a user.

FIG. 10 is a view showing an embodiment in which the collimator 1500, the optical integrated circuit 1200, and the image sensor 1400 are coupled to each other.

Referring to FIG. 10, in the camera module 1000 according to the embodiment, the collimator 1500, which aligns reflected light, is disposed at one end of the optical integrated circuit 1200, and a total reflection unit 1203 for changing the path of the reflected light incident through the collimator 1500 is disposed at the other end of the optical integrated circuit 1200. In this case, the image sensor 1400 may be disposed at one surface of the total reflection unit 1203.

In this embodiment, the image sensor 1400 is illustrated as being disposed at the lower surface of the total reflection unit 1203. However, the disclosure is not limited thereto. It is sufficient to dispose the image sensor 1400 such that the image sensor 1400 may receive reflected light, the path of which has been changed, from the total reflection unit 1203.

The total reflection unit 1203 may include a housing 1205 defining the external appearance thereof and an inclined part 1207 disposed in the housing 1205 at an incline.

The inclined part 1207 may be inclined at a predetermined angle in order to change the path X of light transmitted to the total reflection unit 1203 and to transmit the light, the path of which has been changed, to the image sensor 1400.

The image sensor 1400 may include a camera sensor unit 1430 for processing image information of the object 1800 received from the lens driving apparatus 1100 and a spectrometer sensor unit 1410 for processing physical property information of the object 1800 received from the optical integrated circuit 1200.

The spectrometer sensor unit 1410 may be disposed so as to be in surface contact with the total reflection unit 1203 in a first direction.

The first direction may be a direction in which the spectrometer sensor unit 1410 faces the lower surface of the total reflection unit 1203.

That is, the path of light transmitted to the optical integrated circuit 1200 is changed by the total reflection unit 1203 so that the light proceeds in the first direction, and the light, the path of which has been changed, is incident on the spectrometer sensor unit 1410.

In addition, although not shown in the figure, the total reflection unit 1203 may not be disposed, and the spectrometer sensor unit 1410 may be disposed so as to be in surface contact with the optical integrated circuit 1200 in a second direction, which is perpendicular to the first direction.

FIG. 11 is a view showing another embodiment in which the collimator 1500, the optical integrated circuit 1200, and the image sensor 1400 are coupled to each other, and FIG. 12 is a view of a still another embodiment in which the collimator 1500, the optical integrated circuit 1200, and the image sensor 1400 are coupled to each other.

The basic construction of the camera module 1000 according to each of the embodiments shown in FIGS. 11 and 12 is identical to that of the camera module according to the embodiment shown in FIG. 10 except that the image sensor 1400 and the total reflection unit 1203 have a different coupling relationship therebetween, which will be described below.

Unlike FIG. 10, in which the image sensor unit 1400 is disposed so as to be in surface contact with the lower surface of the total reflection unit 1203, the image sensor 1400 according to each of the embodiments shown in FIGS. 11 and 12 may be disposed so as to be spaced apart from the total reflection unit 1203 by a predetermined distance.

The image sensor 1400 according to the embodiment shown in FIG. 11 may be disposed so as to be spaced apart from the total reflection unit 1203 by a predetermined distance in a third direction, and the image sensor 1400 according to the embodiment shown in FIG. 12 may be disposed so as to be spaced apart from the total reflection unit 1203 by a predetermined distance in a fourth direction, which is perpendicular to the third direction. Here, the third direction may be identical to or different from the first direction, and the fourth direction may be identical to or different from the second direction.

The third direction may be perpendicular to the lower surface of the total reflection unit 1203.

In addition, the camera module 1000 according to the embodiment may further include an optical cable 1209 having one end communicating with the total reflection unit 1203 and the other end communicating with the image sensor 1400 in order to transmit reflected light from the total reflection unit 1203 to the image sensor 1400.

The optical cable 1209 may include a first optical cable 1209-1, a second optical cable 1209-3, and a third optical cable 1209-5 for transmitting light split through the optical integrated circuit 1200 to the spectrometer sensor unit 1410 of the image sensor 1400.

It is assumed that light moves from the optical integrated circuit 1200 to the total reflection unit 1203 via three optical paths $X_1$, $X_2$, and $X_3$. However, the disclosure is not limited thereto.

The first optical path $X_1$ is a path of light that is totally reflected by the inclined part 1207 of the total reflection unit 1203 and advances to the first optical cable 1209-1. The second optical path $X_2$ is a path of light that is totally reflected by the inclined part 1207 of the total reflection unit 1203 and advances to the second optical cable 1209-3. The third optical path $X_3$ is a path of light that is totally reflected by the inclined part 1207 of the total reflection unit 1203 and advances to the third optical cable 1209-5.

Light incident on the first optical cable 1209-1, the second optical cable 1209-3, and the third optical cable 1209-5 is incident on the spectrometer sensor unit 1410 of the image sensor 1400 such that the physical properties of the object 1800 are analyzed by the controller 1600.

In this embodiment, the optical cable 1209 is illustrated as including three optical cables 1209-1, 1209-3, and 1209-5, for the convenience of description. As needed, however, a single optical cable 1209 may be provided, two optical cables may be provided, or four or more optical cables may be provided.

It is sufficient to configure the optical cable 1209 such that light can be transmitted from the total reflection unit 1203 to the spectrometer sensor unit 1410 of the image sensor 1400. Therefore, the disclosure is not limited to the embodiments shown in FIGS. 11 and 12.

In the camera module 1000 according to the embodiment shown in FIG. 11 or 12, the optical integrated circuit 1200 and the image sensor 1400 are spaced apart from each other, unlike the embodiment shown in FIG. 10. In the camera module 1000, therefore, the positions of the lens driving apparatus 1100, the optical integrated circuit 1200, and the image sensor 1400 may be more easily changed, whereby it is possible to further miniaturize the camera module 1000.

The optical integrated circuit 1200 may be an optical arrayed waveguide grating-type multiplexer and demultiplexer.

The optical integrated circuit 1200 may be realized by the optical arrayed waveguide grating-type multiplexer and demultiplexer 100, 100A, 100B, or 100C shown in FIGS. 1 to 4b. However, the disclosure is not limited thereto.

Hereinafter, the lens driving apparatus 1100 of the camera module 1000 according to the embodiment will be described with reference to FIGS. 13 to 15. The embodiment shown in FIGS. 13 to 15 will be described using a rectangular coordinate system (x, y, z). However, the disclosure is not limited thereto. That is, the embodiment may be described using other different coordinate systems. In each figure, the x-axis and the y-axis indicate planes that are perpendicular to the optical axis. For the sake of convenience, the z-axis direction, which is the optical-axis direction, may be referred to as a first direction, the x-axis direction may be referred to as a second direction, and the y-axis direction may be referred to as a third direction.

FIG. 13 is a perspective view schematically showing a lens driving apparatus 1100 according to an embodiment, FIG. 14 is an exploded perspective view schematically showing the lens driving apparatus 1100 shown in FIG. 13, and FIG. 15 is a perspective view schematically showing the lens driving apparatus 1100 of FIG. 13, from which a cover can 1102 has been removed.

In the lens driving apparatus 1100 according to the embodiment, through the controlling of a focus control unit (not shown), the distance between a lens (not shown) and the image sensor 1400 may be adjusted such that the image sensor 1400 may be located at the focal distance of the lens. That is, the focus control unit may perform an 'automatic focusing function' of automatically focusing the lens in the lens driving apparatus 1100.

As shown in FIGS. 13 to 15, the lens driving apparatus 1100 according to the embodiment may include a cover can 1102, a bobbin 1110, a first coil 1120, a driving magnet 1130, a housing member 1140, an upper elastic member 1150, a lower elastic member 1160, a first circuit board 1170, a position sensing unit 1180, a sensing magnet 1182, and a base 1190.

The cover can 1102 may be generally formed in a box shape and may be mounted to, may be located at, may contact, may be fixed to, may be temporarily fixed to, may be supported by, may be coupled to, or may be disposed at the upper part of the base 1190. The bobbin 1110, the first coil 1120, the driving magnet 1130, the housing member 1140, the upper elastic member 1150, the lower elastic member 1160, the first circuit board 1170, the position sensing unit 1180, and the sensing magnet 1182 may be received in a receiving space defined as the cover can 1102 is mounted to, is located at, contacts, is fixed to, is temporarily fixed to, is supported by, is coupled to, or is disposed at the base 1190.

The cover can 1102 may be provided in the upper surface thereof with an opening 1101, through which the lens (not shown) coupled to the bobbin 1110 is exposed to external light. In addition, a window made of a light transmissive material may be provided in the opening 1101. As a result, it is possible to prevent foreign matter, such as dust or moisture, from being introduced into the camera module 1000.

The cover can 1102 may be provided at the lower part thereof with a first recess 1104, and the base 1190 may be provided at the upper part thereof with a second recess 1192. When the cover can 1102 is mounted to, is located at, contacts, is fixed to, is temporarily fixed to, is supported by, is coupled to, or is disposed at the base 1190, as will be described below, the second recess 1192 may be formed in the portion of the base 1190 that contacts the first recess 1104 (i.e. the portion of the base 1190 that corresponds to the first recess 1104). A recess unit having a predetermined area may be formed through the contact, disposition, or coupling of the first recess 1104 and the second recess 1192. An adhesive member having viscosity, such as epoxy, may be injected and applied into the recess unit. That is, the adhesive member applied into the recess unit may fill the gap between facing surfaces of the cover can 1102 and the base 1190 through the recess unit in order to achieve a seal between the cover can 1102 and the base 1190 in the state in which the cover can 1102 is mounted to, is located at, contacts, is fixed to, is temporarily fixed to, is supported by, is coupled to, or is disposed at the base 1190. In addition, the side surfaces of the cover can 1102 and the base 1190 may be sealed or coupled to each other in the state in which the cover can 1102 is mounted to, is located at, contacts, is fixed to, is temporarily fixed to, is supported by, is coupled to, or is disposed at the base 1190.

In addition, the cover can 1102 may further include a third recess 1106. The third recess 1106 may be formed in the surface of the cover can 1102 that corresponds to a terminal surface of the first circuit board 1170 such that the cover can 1102 does not interfere with a plurality of terminals 1171 formed on the terminal surface. The third recess 1106 may be formed concavely in the entire surface of the cover can 1102 that faces the terminal surface of the first circuit board 1170. An adhesive member may be applied inside the third recess 1106 in order to seal or couple the cover can 1102, the base 1190, and the first circuit board 1170.

The first recess 1104 and the third recess 1106 may be formed in the cover can 1102, and the second recess 1192 may be formed in the base 1190. However, the disclosure is not limited thereto. That is, in another embodiment, the first to third recesses 1104, 1192, and 1106 may be formed only in either the base 1190 or the cover can 1102.

In addition, the cover can 1102 may be made of metal. However, the disclosure is not limited as to the material for the cover can 1102. In addition, the cover can 1102 may be made of a magnetic material.

The base 1190 may be generally formed in a quadrangular shape. The base 1190 may be provided with a step portion protruding outward with a predetermined thickness so as to surround the lower edge part thereof. The step portion may be formed in the shape of a continuous band type or a discontinuous band type where a center portion of the step portion is intermitted. The thickness of the step portion may be equal to the thickness of the side surface of the cover can 1102. When the cover can 1102 is mounted to, is located at, contacts, is fixed to, is temporarily fixed to, is supported by, is coupled to, or is disposed at the base 1190, the side surface of the cover can 1102 may be mounted to, may be located at, may contact, may be coupled to, may be fixed to, may be supported by, or may be disposed at the upper part or the side surface of the step portion. As a result, the cover can 1102, which is coupled to the upper side of the step portion, may be guided by the step portion. In addition, the end of the cover can 1102 may be coupled to the step portion so as to be in surface contact with the step portion. The end of the cover can 1102 may include the bottom surface or the side surface of the cover can 1102. The step portion and the end of the cover can 1102 may be fixed, coupled, or sealed to each other using an adhesive, etc.

The second recess 1192 may be formed in the step portion at a position thereof corresponding to the first recess 1104 of the cover can 1102. As previously described, the second recess 1192 may be coupled to the first recess 1104 of the cover can 1102 to form a recess unit, which is a space filled with an adhesive member.

In the same manner as the cover can 1102, the base 1190 may be provided in the vicinity of the center thereof with an opening. The opening may be formed at a position of the base 1190 that corresponds to the position of the image sensor 1400 disposed in the camera module.

In addition, the base 1190 may be provided at four corners thereof with four guide members 1194 vertically protruding upward to a predetermined height. Each of the guide members 1194 may be formed in the shape of a multi-sided prism. The guide members 1194 may be mounted in, may be located in, may be inserted into, may contact, may be coupled to, may be fixed to, may be supported by, or may be disposed in lower guide recesses (not shown) of the housing member 1140. When the housing member 1140 is mounted to, is located at, contacts, is coupled to, is fixed to, is supported by, or is disposed at the upper part of the base 1190 by the guide members 1194 and the lower guide recesses (not shown), the coupling position of the housing member 1140 on the base 1190 may be guided, and the coupling area therebetween may be increased. In addition, the housing member 1140 is prevented from deviating from a reference position, at which the housing member is to be mounted, due to vibration generated during the operation of the lens driving apparatus 1100 or due to errors of a worker during the coupling process.

The housing member 1140 may be provided at the upper surface thereof with a plurality of first protruding stoppers 1142. The first stoppers 1142 are provided to prevent collisions between the cover can 1102 and the body of the housing member 1140. When external impact occurs, the upper surface of the housing member 1140 may be prevented from directly colliding with the inner surface of the upper part of the cover can 1102. In addition, the first stoppers 1142 may serve to guide the installation position of the upper elastic member 1150.

In addition, the housing member 1140 may be provided at the upper side thereof with a plurality of upper frame-supporting protrusions 1144, which an outer frame (not shown) of the upper elastic member 1150 may be inserted into, may be located at, may contact, may be fixed to, may be temporarily fixed to, may be coupled to, may be supported by, or may be disposed at. First through-holes (or recesses) (not shown) may be formed in the outer frame (not shown) of the upper elastic member 1150 so as to correspond to the upper frame-supporting protrusions 1144. The upper frame-supporting protrusions 1144 may be fixed using an adhesive or by welding after being inserted into, located at, brought into contact with, fixed to, temporarily fixed to, coupled to, supported by, or disposed in the first through-holes. The welding may include thermal welding or ultrasonic welding, etc.

The first circuit board 1170 may be provided with at least one pin 1172. As shown, four pins 1172 may be provided. However, the number of pins 1172 may be greater than or less than 4. For example, the four pins 1172 may be a test pin, a hole pin, a VCM+ pin, and a VCM− pin. However, the disclosure is not limited as to the kind of pins. The test pin may be a pin used to evaluate the performance of the lens driving apparatus 1100. The hole pin may be a pin used to read data out output from the position sensing unit 1180. The VCM+ pin and the VCM− pin may be pins used to evaluate the performance of the lens driving apparatus 1100 without feedback from the position sensing unit 1180.

The housing member 1140 may be provided at first opposite sides thereof, among four sides thereof, with magnet through-holes (or recesses) (not shown), which driving magnets 1130 may be mounted in, may be inserted into, may be located in, may contact, may be coupled to, may be fixed to, may be supported by, or may be disposed in. The magnet through-holes may have sizes and/or shapes corresponding to those of the driving magnets 1130. Furthermore, the magnet through-holes may have shapes that are capable of guiding the driving magnets 1130. One of the driving magnets 1130 (hereinafter, referred to as a 'first driving magnet 1131') and the other of the driving magnets 1130 (hereinafter, referred to as a 'second driving magnet 1132') may be mounted in, may be inserted into, may be located in, may contact, may be coupled to, may be fixed to, may be supported by, or may be disposed in first and second magnet through-holes, respectively. In this embodiment, a total of two driving magnets 1130 is provided. However, the disclosure is not limited thereto. That is, four driving magnets 1130 may be provided.

A ferrite magnet, an alnico magnet, or a rare-earth magnet may be used as each of the driving magnets 1130, and each of the driving magnets 1130 may be a P-type magnet or an F-type magnet, which is classified based on the form of a magnetic circuit. However, the disclosure is not limited as to the kind of the driving magnets 1130.

The lower elastic member 1160 may include a first lower elastic member 1160a and a second lower elastic member 1160b, which are separated from each other. In this halved structure, powers having different poles or different currents may be supplied to the first lower elastic member 1160a and the second lower elastic member 1160b of the lower elastic member 1160. That is, after an inner frame (not shown) and an outer frame (not shown) are coupled to the bobbin 1100 and the housing member 1140, respectively, solder portions may be provided in portions of the inner frame corresponding to opposite ends of the first coil 1120, disposed at the bobbin 1110, by performing the connection for applying an electric current such as soldering at the solder portions in order to receive powers having different poles or different currents. In addition, the first lower elastic member 1160a may be electrically connected to one of the opposite ends of the first coil 1120 and the second lower elastic member 1160b may be electrically connected to the other of the opposite ends of the first coil 1120 in order to receive external current and/or voltage. To this end, at least one of the inner frame or the outer frame of the lower elastic member 1160 may include at least one terminal electrically connected to at least one of the first coil 1120 of the bobbin 1110 or the first circuit board 1170. The opposite ends of the first coil 1120 may be disposed so as to be opposite each other with respect to the bobbin 1110. Alternatively, the opposite ends of the first coil 1120 may be disposed at the same side so as to be adjacent to each other.

Hereinafter, a mobile phone device according to a still another embodiment will be described with reference to the accompanying drawings.

FIG. 16 is a partial perspective showing the external appearance of a mobile phone device 1900 including the camera module 1000 according to the embodiment.

Referring to FIG. 16, the mobile phone device 1900 according to the embodiment may include a mobile phone device housing 1910 defining the external appearance thereof and a camera module mounting unit 1930 disposed at one surface of the mobile phone device housing 1910 for allowing the camera module to be mounted therein.

The camera module mounting unit 1930 may include a lens driving apparatus 1100 for collecting image information of an object 1800, a light emission unit 1710 for emitting light to the object 1800, and a collimator 1500 for collecting and aligning reflected light generated as the result of the light emitted from the light emission unit 1710 being reflected by the object 1800.

In this embodiment, the lens driving apparatus 1100, the light emission unit 1710, and the collimator 1500 are disposed so as to be adjacent to each other in the state of being spaced apart from each other by a predetermined distance in the camera module mounting unit 1930. However, the above disposition is illustrated only for the convenience of description, and does not limit the scope of rights of the disclosure. The positions of the lens driving apparatus 1100, the light emission unit 1710, and the collimator 1500 may be changed as needed.

The camera module 1000 may be miniaturized, as previously described. Since the camera module 1000 can collect the physical property information of the object 1800 as well as the image information of the object 1800, the camera module 1000 may be disposed in the portable mobile phone device 1900 in order to provide various kinds of information to a user.

More specifically, a conventional mobile phone device displays only simple image information of the object 1800 through a display unit (not shown). In contrast, the mobile phone device 1900 according to the embodiment is capable of displaying the freshness, moisture, and calorie count of the object 1800 as well as simple image information of the object 1800 through a display unit (not shown). Consequently, it is possible to provide a greater variety of information about the object to the user.

Although embodiments have been described with reference to a number of illustrative embodiments thereof, it should be understood that the embodiments are illustrative and not restrictive and that numerous other modifications and applications may be devised by those skilled in the art that will fall within the intrinsic aspects of the embodiments. For example, various variations and modifications are possible in concrete constituent elements of the embodiments. In addition, it is to be understood that differences relevant to the variations and modifications fall within the spirit and scope of the present disclosure defined in the appended claims.

MODE FOR INVENTION

Various embodiments have been described in the best mode for carrying out the invention.

INDUSTRIAL APPLICABILITY

An optical arrayed waveguide grating-type multiplexer and demultiplexer according to an embodiment may be used in an optical communication field or an image processing field, and a camera module may be used in a mobile phone device, etc.

The invention claimed is:
1. A camera module, comprising:
a lens driver configured to collect image information of an object;
a spectrometer configured to collect physical property information of the object, the spectrometer including:
a light emitter configured to emit light to the object;
a collimator configured to collect and align reflected light generated as a result of the light emitted from the light emitter being reflected by the object, wherein the light emitted from the light emitter is directed to the object independent of the collimator;
an optical integrated circuit configured to split the reflected light aligned by the collimator; and
a reflector disposed at a first end of the optical integrated circuit and configured to change an optical path of the reflected light split by the optical integrated circuit;
a printed circuit board;
an image sensor disposed on the printed circuit board and configured to acquire the image information of the object collected by the lens driver and the physical property information of the object collected by the spectrometer; and
a controller disposed on the printed circuit board and configured to control the lens driver and to process the information acquired from the image sensor.

2. The camera module according to claim 1, further comprising a driver configured to control the light emitter based on a control signal from the controller.

3. The camera module according to claim 1, wherein the reflector comprises an inclined portion to change the path of the reflected light transmitted to the reflector and to transmit the reflected light to the image sensor.

4. The camera module according to claim 1, wherein the collimator is disposed at a second end of the optical integrated circuit.

5. The camera module according to claim 4, wherein the collimator, the optical integrated circuit, and the reflector are disposed in a same plane.

6. The camera module according to claim 5, wherein the image sensor comprises:
a camera sensor to acquire the image information of the object collected by the lens driver; and
a spectrometer sensor to acquire the physical property information of the object collected by the spectrometer.

7. The camera module according to claim 6, wherein the spectrometer sensor is disposed so as to be in contact with a lower surface of the reflector.

8. The camera module according to claim 7, wherein the spectrometer sensor is disposed under the reflector so as to be spaced apart from the reflector by a predetermined distance.

9. The camera module according to claim 1, wherein the image sensor is disposed so as to be spaced apart from the reflector.

10. The camera module according to claim 9, further comprising an optical cable configured to connect the reflector and the image sensor.

11. The camera module according to claim 10, wherein the optical cable comprises a plurality of optical cables.

12. The camera module according to claim 11, wherein each of the plurality of optical cables is configured to transmit respective light split through the optical integrated circuit to the image sensor.

* * * * *